United States Patent
Pande et al.

(10) Patent No.: US 12,380,058 B2
(45) Date of Patent: Aug. 5, 2025

(54) HARDWARE-BASED IMAGE/VIDEO PROCESSING IN MACHINE LEARNING-ACCELERATOR SYSTEM-ON-CHIP

(71) Applicant: QUALCOMM Incorporated, San Diego, CA (US)

(72) Inventors: Sandeep Pande, Bengaluru (IN); Satish Singh, Bangalore (IN); Colin Beaton Verrilli, Apex, NC (US); Natarajan Vaidhyanathan, Carrboro, NC (US); Vinay Murthy, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 10 days.

(21) Appl. No.: 18/333,377

(22) Filed: Jun. 12, 2023

(65) Prior Publication Data

US 2024/0411718 A1    Dec. 12, 2024

(51) Int. Cl.
*G06F 15/80* (2006.01)
*G06F 9/50* (2006.01)

(52) U.S. Cl.
CPC ............ *G06F 15/80* (2013.01); *G06F 9/5027* (2013.01)

(58) Field of Classification Search
CPC .............................. G06F 15/80; G06F 9/5027
See application file for complete search history.

(56) References Cited

U.S. PATENT DOCUMENTS

| | | | |
|---|---|---|---|
| 2019/0164037 A1* | 5/2019 | Kim | G06N 3/04 |
| 2020/0104690 A1 | 4/2020 | Bai et al. | |
| 2020/0293828 A1* | 9/2020 | Wang | G06N 3/04 |
| 2022/0269937 A1* | 8/2022 | Kim | G06N 3/044 |

OTHER PUBLICATIONS

International Search Report and Written Opinion—PCT/US2024/027088—ISA/EPO—Jul. 24, 2024.

* cited by examiner

*Primary Examiner* — Michael J Metzger
(74) *Attorney, Agent, or Firm* — Seyfarth Shaw LLP (57) ABSTRACT

A machine learning (ML)-accelerator system-on-chip (SoC) is described. The ML-accelerator SoC includes a set of ML-accelerator cores. The ML-accelerator SoC also includes a network-on-chip (NoC) coupled to the set of ML-accelerator cores. The ML-accelerator SoC further includes an inference video post processing (infVPP) module coupled to the NoC. The ML-accelerator SoC also includes a video decoder coupled to the NoC.

16 Claims, 10 Drawing Sheets

HARDWARE-BASED IMAGE/VIDEO PROCESSING IN MACHINE LEARNING-ACCELERATOR SYSTEM-ON-CHIP

TECHNICAL FIELD

Certain aspects of the present disclosure relate to artificial neural networks and, more particularly, to hardware-based image/video processing in a machine learning (ML)-accelerator system-on-chip (SoC).

BACKGROUND

An artificial neural network, which may include an interconnected group of artificial neurons, may be a computational device or may represent a method to be performed by a computational device. Artificial neural networks may have corresponding structure and/or function in biological neural networks. Artificial neural networks, however, may provide useful computational techniques for certain applications, in which traditional computational techniques may be cumbersome, impractical, or inadequate. Because artificial neural networks may infer a function from observations, such networks may be useful in applications where the complexity of the task and/or data makes the design of the function burdensome using conventional techniques.

In computing, hardware acceleration is the use of computer hardware to perform functions more efficiently than is possible in software running on a general-purpose central processing unit (CPU). The hardware that performs the acceleration may be referred to as a hardware-accelerator. Machine learning (ML)-accelerators may improve the performance of artificial neural networks. Unfortunately, video decoder output formats for supporting video/imaging centric applications and input formats specified by ML-network models executing on neural signal processors (NSPs) do not match. Specified video/image processing, format conversion, data scaling and data packing processes can be executed on NSPs to support these video/imaging centric applications, but this involves considerable computation resources, leading to a significant drop in inference per second efficiency. A next generation ML-accelerator system-on-chip (SoC) having an on-chip video decoder module to enable single chip video/imaging centric ML applications is desired.

SUMMARY

A machine learning (ML)-accelerator system-on-chip (SoC) is described. The ML-accelerator SoC includes a set of ML-accelerator cores. The ML-accelerator SoC also includes a network-on-chip (NoC) coupled to the set of ML-accelerator cores. The ML-accelerator SoC further includes an inference video post processing (infVPP) module coupled to the NoC. The ML-accelerator SoC also includes a video decoder coupled to the NoC.

A processor-implemented method for video inference processing on a machine learning (ML)-accelerator system on chip (SoC) is described. The method includes decoding video/image data received in a first storage format. The method also includes storing decoded video/image data in a predetermined video format in a first memory of the ML-accelerator SoC. The method further includes converting the decoded video/image data stored in the first memory into activation input data stored in a second memory of the ML-accelerator SoC. The method also includes processing the activation input data stored in the second memory by ML networks executing on ML-accelerator cores of the ML-accelerator SoC.

This has outlined, broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for conducting the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. Nevertheless, it will be apparent to those skilled in the art that these concepts may be practiced without these specific details. In some instances, well-known structures and components are shown in block diagram form to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented, or a method may be practiced using any number of the aspects set forth. In addition, the scope of the disclosure is intended to cover such an apparatus or method practiced using other structure, functionality, or structure and functionality in addition to or other than the various aspects of the disclosure set forth. Any aspect of the disclosure disclosed may be embodied by one or more elements of a claim.

Although aspects are described, many variations and permutations of these aspects fall within the scope of the disclosure. Although some benefits and advantages of the preferred aspects are mentioned, the scope of the disclosure is not intended to be limited to benefits, uses, or objectives. Rather, aspects of the disclosure are intended to be universally applicable to different technologies, system configurations, networks, and protocols, some of which are illustrated by way of example in the figures and in the following description of the preferred aspects. The detailed description and drawings are merely illustrative of the disclosure, rather than limiting the scope of the disclosure being defined by the appended claims and equivalents thereof.

In computing, hardware acceleration is the use of computer hardware to perform functions more efficiently than is possible in software running on a general-purpose central processing unit (CPU). The hardware that performs the acceleration may be referred to as a hardware (HW)-accelerator. A HW-accelerator is designed for a particular configuration of input data. Consequently, input data that is configured differently is unlikely to benefit from the HW-accelerator.

A machine learning-accelerator is an example of a HW-accelerator configured to improve the performance of artificial neural networks. Like a HW-accelerator, machine learning-accelerators are designed for a particular configuration of input data. For example, a convolutional neural network (CNN)-accelerator is designed for input blocks, which may be referred to as croutons, having tens of channels. These input blocks correspond to many layers, which are composed of many channels; however, the first layer of a CNN often has an input having only a few channels (e.g., three or four). As a result, the input blocks to a CNN-accelerator, based on the first layer input, are padded with zeros to fill the other channels, which significantly reduces the efficiency of processing the first layer with a CNN-accelerator.

In practice, a first layer of many computer vision machine learning (ML) networks has an input that is composed of three channels (e.g., red, green, and blue (RGB)). For example, a tensor may represent the first layer of a computer vision ML network according to a standard NCHW (e.g., batch_size (N), channel (C), height (H), weight (W)) format or an NHWC (e.g., batch_size (N), height (H), weight (W), channel (C)) format, which is fully packed and does not waste any space. By contrast, layers of a computer vision ML network beyond the first layer usually have a greater number of channels (e.g., 32 or more channels).

ML hardware-accelerators expect a different data format. Input tensors encountered in computer vision networks have three channels in the first layer and a considerable number of channels (e.g., 32 or more) in the subsequent layers. Typically, these ML-accelerators are architected for processing tensors having multiples-of-32 channels. Nevertheless, when tensors have fewer than 32 channels (e.g., the first layer with three channels), the three-channel tensor may be padded with random data to convert to an expected 32-channel tensor. Because there are typically many layers other than the first layer in vision networks, it is a reasonable trade-off to pad the three-channel tensor with random data for converting to the expected 32-channel tensor.

Unfortunately, storage of this type of padded tensor occupies many times the space (e.g., 32 is ten times three). As a result, preparation for first layer processing results in a large allocation of tightly coupled memory (TCM) space due to wasted channel depth associated with the first layer of computer vision neural networks. This larger allocation of TCM space may result in a ten-fold expansion of the TCM space. Furthermore, high definition (HD) images provided by computer vision neural networks can be large (e.g., full HD is 1920×1080 pixels), which may cause spillage to remote/off-chip/external memory. If this space expansion is statically allocated and if it is the largest user of the TCM space, then network weights may be forced to use dynamic random-access memory (DRAM). In addition, for video processing, several streams and multiple frames from each stream may be in flight at any one time. Consequently, DRAM memory allocation can become an issue if the ten-fold expansion is performed for each frame of the HD images. Furthermore, if the first layer preparation is performed on the host, then interconnect traffic (e.g., peripheral component interconnect express (PCIe) traffic) may increase ten-fold.

A machine learning (ML) storage acceleration format that reduces wasted allocation of the TCM space and DRAM, as well as wasted bandwidth for moving padding and wasted PCIe bandwidth is desired. A memory storage format for supporting ML acceleration in computer vision networks is desired. A packed dense depth data dump (D4) format is described in co-pending U.S. patent application Ser. No. 17/946,753, which is incorporated by reference in its entirety.

While the packed D4 format provides improved efficiency, many of the use-cases planned for ML-accelerators are targeted for cloud, edge, and automotive markets. These targeted markets for ML-accelerators are video or imaging centric. Currently, the video use-cases involve a multi-chip solution, including a machine learning (ML)-accelerator, a video decoder, and video/image processor. Unfortunately, video decoder output formats and the input formats specified by the ML-network models executing on neural signal processors (NSPs) do not match. The specified video or image processing, format conversion, data scaling, and data packing processes can be executed on NSPs; however, this execution involves considerable computing resources, leading to a drop in inferences per second (inference/sec) efficiency. A next generation ML-accelerator system-on-chip (SoC), having an on-chip video decoder module to enable single chip video or imaging ML use-cases is desired.

Various aspects of the present disclosure are directed to supporting image/video processing using an ML-accelerator SoC architecture. For example, the ML-accelerator SoC may include a set of ML-accelerator cores coupled together through a network-on-chip (NoC). In some aspects of the present disclosure, the ML-accelerator SoC includes an inference video post processing (infVPP) module coupled to the NoC. The infVPP module is operable to accelerate inference video processing of an image according to assigned addresses for image pixels of the image corresponding to a blocked ML storage acceleration format. Additionally, the ML-accelerator SoC may include a video decoder coupled to the NoC. This configuration of the ML-accelerator SoC supports specified video/image processing, format conversion, data scaling and data packing processes without incurring a drop in inference per second (inference/sec) performance.

Figure 1:
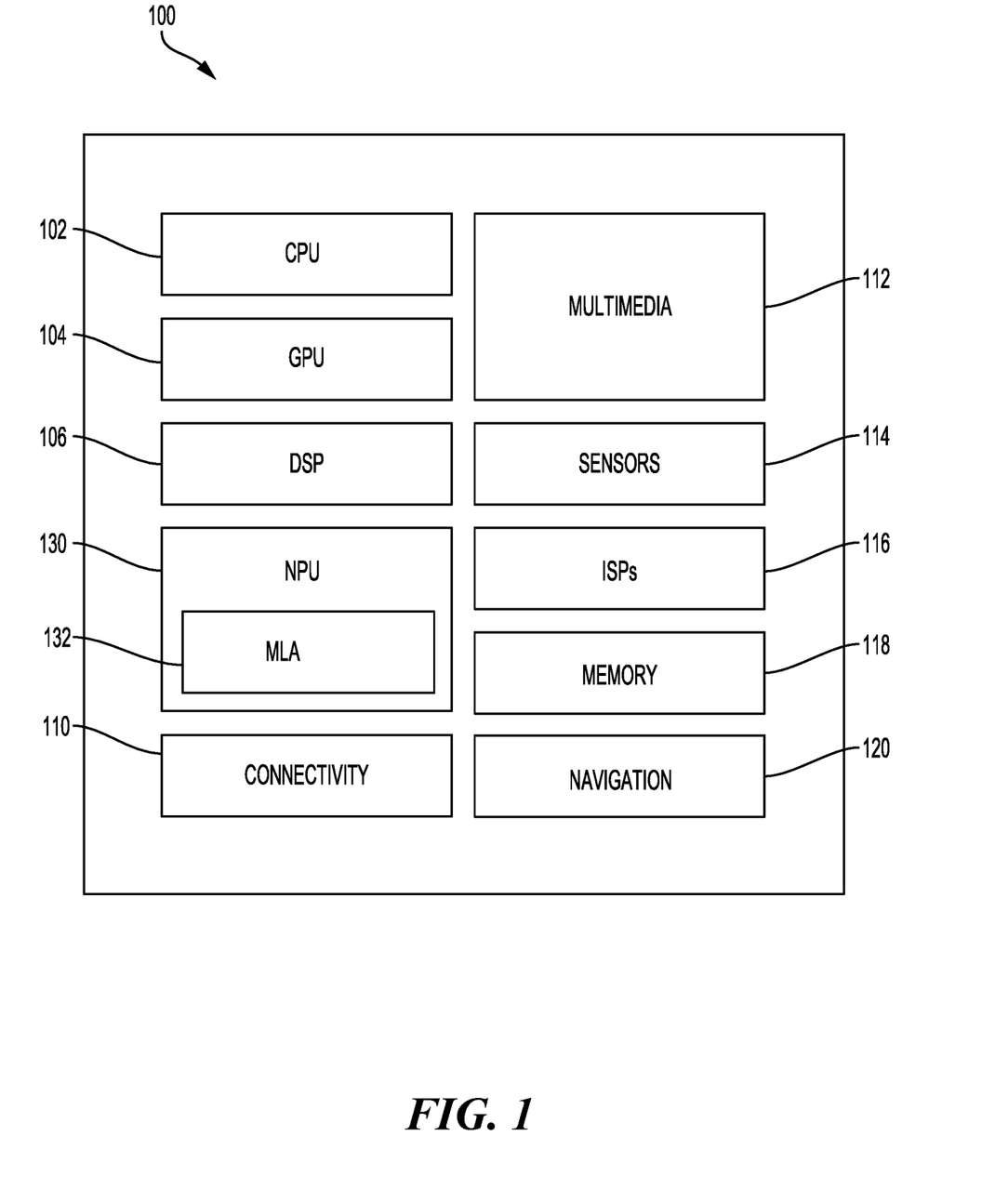
FIG. 1 illustrates an example implementation of designing an artificial intelligence inference accelerator (AIIA) for a neural network using a system-on-chip (SoC), including a general-purpose processor, in accordance with certain aspects of the present disclosure.

FIG. 1 illustrates an example implementation of a system on chip (SoC) 100, which may include a central processing unit (CPU) 102 or multi-core CPUs, in accordance with certain aspects of the present disclosure, such an artificial intelligence (AI) inference accelerator (AIIA). Variables (e.g., neural signals and synaptic weights), system parameters associated with a computational device (e.g., neural network with weights), delays, frequency bin information, and task information may be stored in a memory block associated with a neural processing unit (NPU) 130, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

Figure 3:
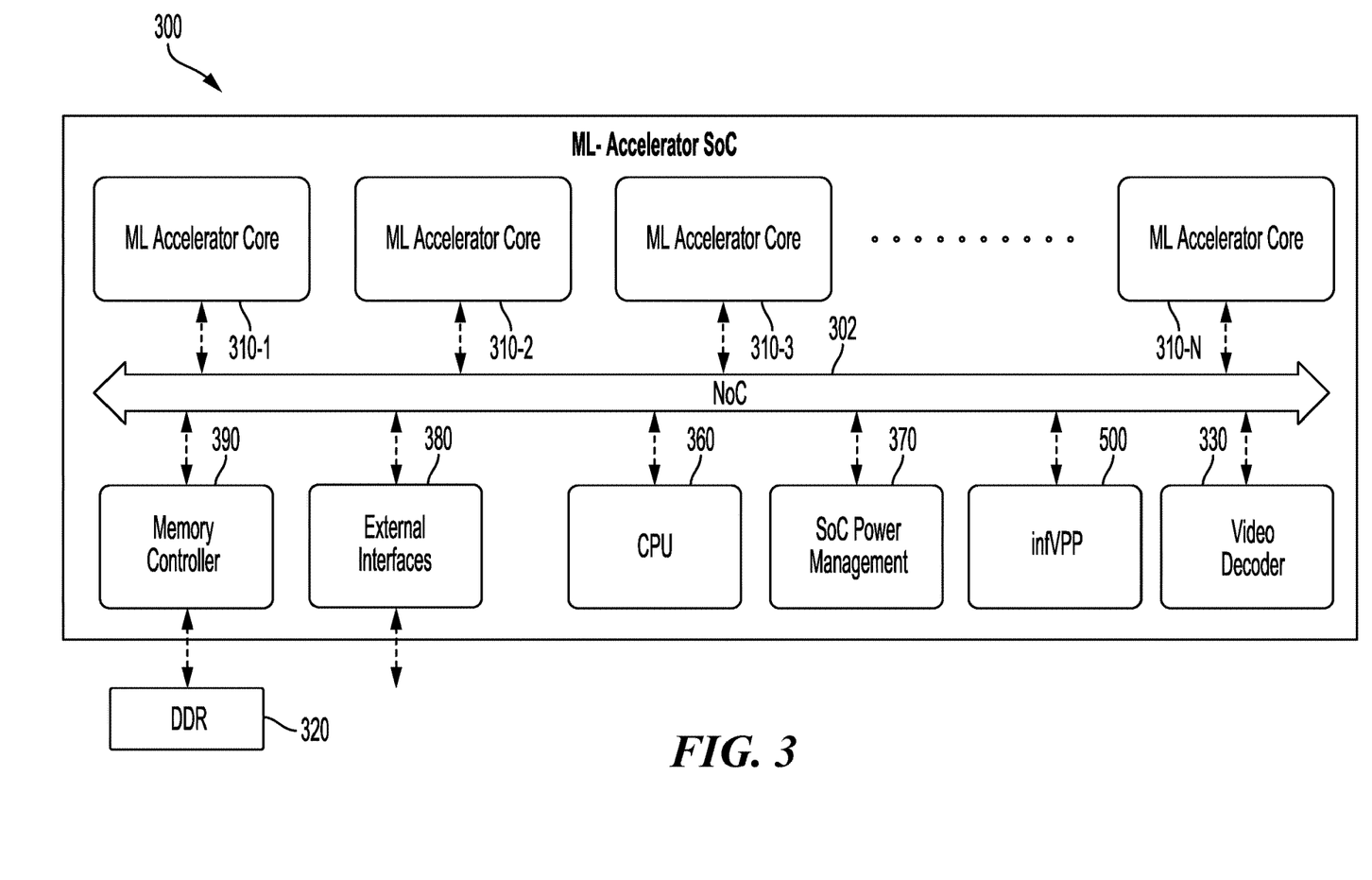
FIG. 3 is a block diagram illustrating a machine learning (ML)-accelerator system-on-chip (SoC) architecture, in accordance with various aspects of the present disclosure.

One aspect of the present disclosure is directed to a machine learning (ML) storage acceleration format for machine learning-accelerators (MLA) 132 of the NPU 130, which may be referred to as a packed dense depth data dump (D4) format. This packed D4 format allows for less wasted space for processing first layers of computer vision neural networks. This packed D4 format can be processed directly by the MLA 132 without having to convert to a standard layout. In some aspects of the present disclosure, the ML storage acceleration format of the MLA 132 supports up to four input channels by packing, for example, eight spatial patches (e.g., 8×8) into one memory storage block. Various aspects of the present disclosure are directed to supporting image/video processing using a machine learning (ML)-accelerator system-on-chip (SoC) architecture, for example, as shown in FIG. 3.

The SoC 100 may also include additional processing blocks tailored to specific functions, such as a connectivity block 110, which may include fifth generation (5G) new radio (NR) connectivity, fourth generation long term evolution (4G LTE) connectivity, unlicensed Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SoC 100 may also include a sensor processor 114 to provide sensor image data, image signal processors (ISPs) 116, and/or navigation module 120, which may include a global positioning system.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are like what a human engineer might design, but through training. Furthermore, a deep network may learn to represent and recognize new types of features that a human might not have considered.

A deep learning architecture may learn a hierarchy of features. If presented with visual data, for example, the first layer may learn to recognize simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in diverse ways to recognize cars, trucks, and airplanes.

Neural networks may be designed with a variety of connectivity patterns. In feed-forward networks, information is passed from lower to higher layers, with each neuron in each layer communicating to neurons in higher layers. A hierarchical representation may be built up in successive layers of a feed-forward network, as described above. Neural networks may also have recurrent or feedback (also called top-down) connections. In a recurrent connection, the output from a neuron in each layer may be communicated to another neuron in the same layer. A recurrent architecture may be helpful in recognizing patterns that span more than one of the input data chunks that are delivered to the neural network in a sequence. A connection from a neuron in each layer to a neuron in a lower layer is called a feedback (or top-down) connection. A network with many feedback connections may be helpful when the recognition of a high-level concept may aid in discriminating the low-level features of an input.

Figure 2A:
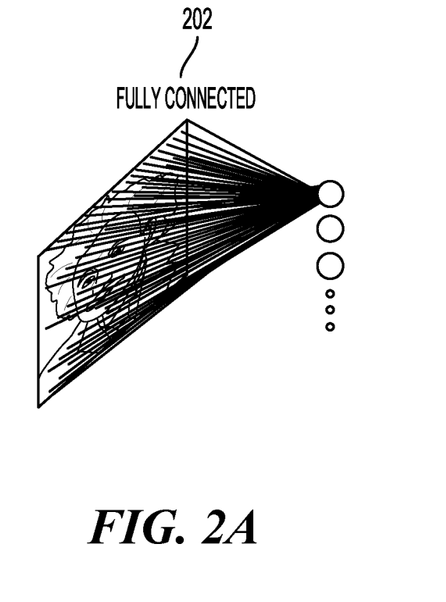
FIGS. 2A, 2B, and 2C are diagrams illustrating a neural network, in accordance with various aspects of the present disclosure.
Figure 2B:
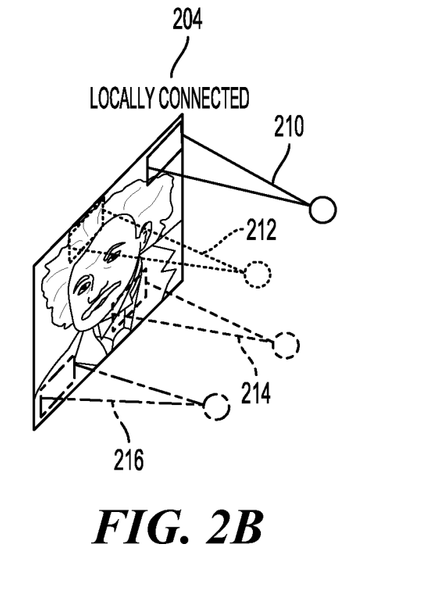

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connection strengths that may have different values (e.g., 210, 212, 214, and 216). The locally connected connectivity pattern may give rise to spatially distinct receptive fields in a higher layer because the higher layer neurons in each region may receive inputs that are tuned through training to the properties of a restricted portion of the total input to the network.

Figure 2C:
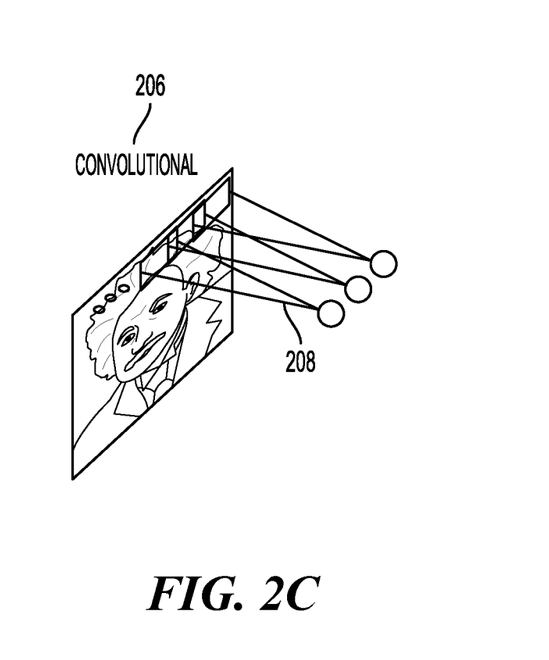

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
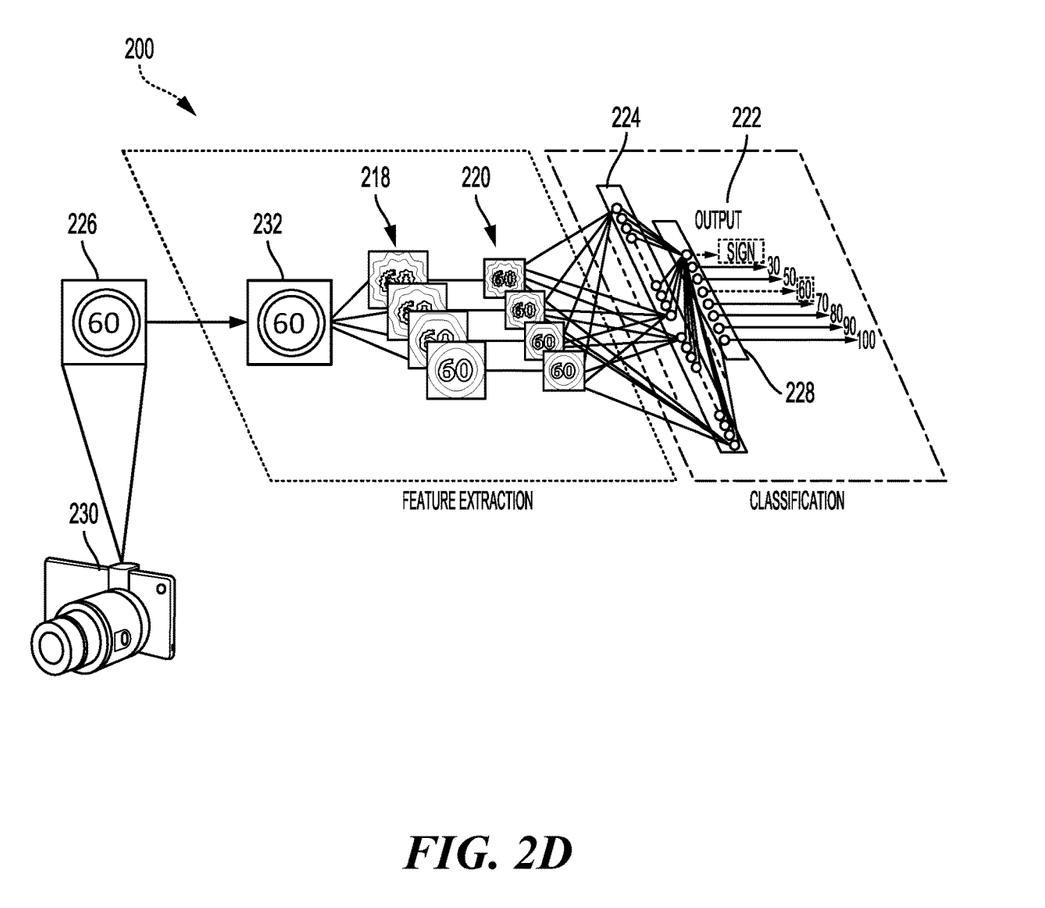
FIG. 2D is a diagram illustrating a neural network, in accordance with various aspects of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different convolutional kernels were applied to the image 226 at the convolutional layer 232, four different feature maps are generated in the first set of feature maps 218. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a feature of the image 226, such as "sign," "60," and "100." A SoftMax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100." Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

A packed dense depth data dump (D4) format, as described in co-pending U.S. patent application Ser. No. 17/946,753, may enable data compatibility with a first layer of the DCN 200. While this packed D4 format provides improved data compatibility with the DCN 200, many of the use-cases planned for ML-accelerators are targeted for cloud, edge, and automotive markets. These targeted markets for ML-accelerators are video or imaging centric. Currently, the video use-cases involve a multi-chip solution, including an ML-accelerator, a video decoder, and video/image processor. Unfortunately, video decoder output formats and the input formats specified by the ML-network models (e.g., the DCN 200) executing on neural signal processors (NSPs), such as the NPU 130, do not match. The specified video or image processing, format conversion, data scaling, and data packing processes can be executed on NSPs; however, this execution involves considerable computing resources, leading to a drop in inferences per second (inference/sec) efficiency. A next generation ML-accelerator system-on-chip (SoC), having an on-chip video decoder module to enable single chip video or imaging ML use-cases is desired.

Figure 5:
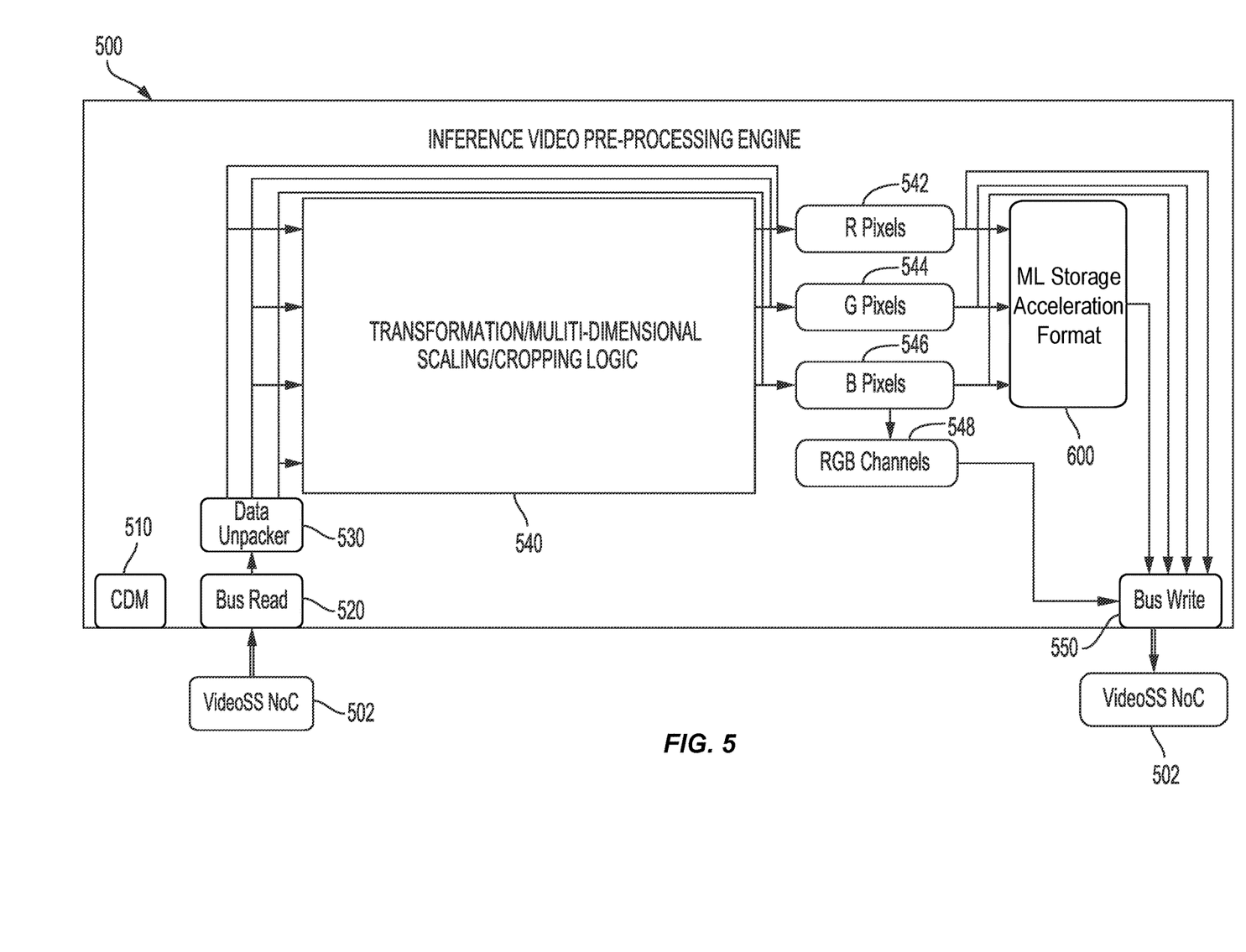
FIG. 5 is a block diagram further illustrating the inference video pre-processing (infVPP) module of FIGS. 3 and 4, in accordance with various aspects of the present disclosure.

FIG. 3 is a block diagram illustrating a machine learning (ML)-accelerator system-on-chip (SoC) architecture, in accordance with various aspects of the present disclosure. As shown in FIG. 3, an ML-accelerator SoC 300 includes a set of ML-accelerator cores 310 (310-1, 310-2, 310-3, . . . , 310-N) coupled together through a network-on-chip (NoC) 302. In some aspects of the present disclosure, the ML-accelerator SoC 300 includes an inference video post processing (infVPP) module 500 coupled to the NoC 302. The infVPP module 500, which is further illustrated in FIG. 5, is operatable to accelerate inference video processing of an image according to assigned addresses for image pixels of the image corresponding to a blocked ML storage acceleration format. Additionally, the ML-accelerator SoC 300 includes a video decoder 330 coupled to the NoC 302.

As shown in FIG. 3, the ML-accelerator SoC 300 includes a central processing unit (CPU) 360 and an SoC power management block 370 to control interoperation between the ML-accelerator cores 310, the video decoder 330, and the infVPP module 500. Additionally, the ML-accelerator SoC 300 includes external interfaces 380 as well as a memory controller 390 to access memory (e.g., double data rate (DDR) 320). This configuration of the ML-accelerator SoC 300 supports specified video/image processing, format conversion, data scaling, and data packing processes without incurring a drop in inference per second (inference/sec) performance, as further illustrated in FIG. 4.

Figure 4:
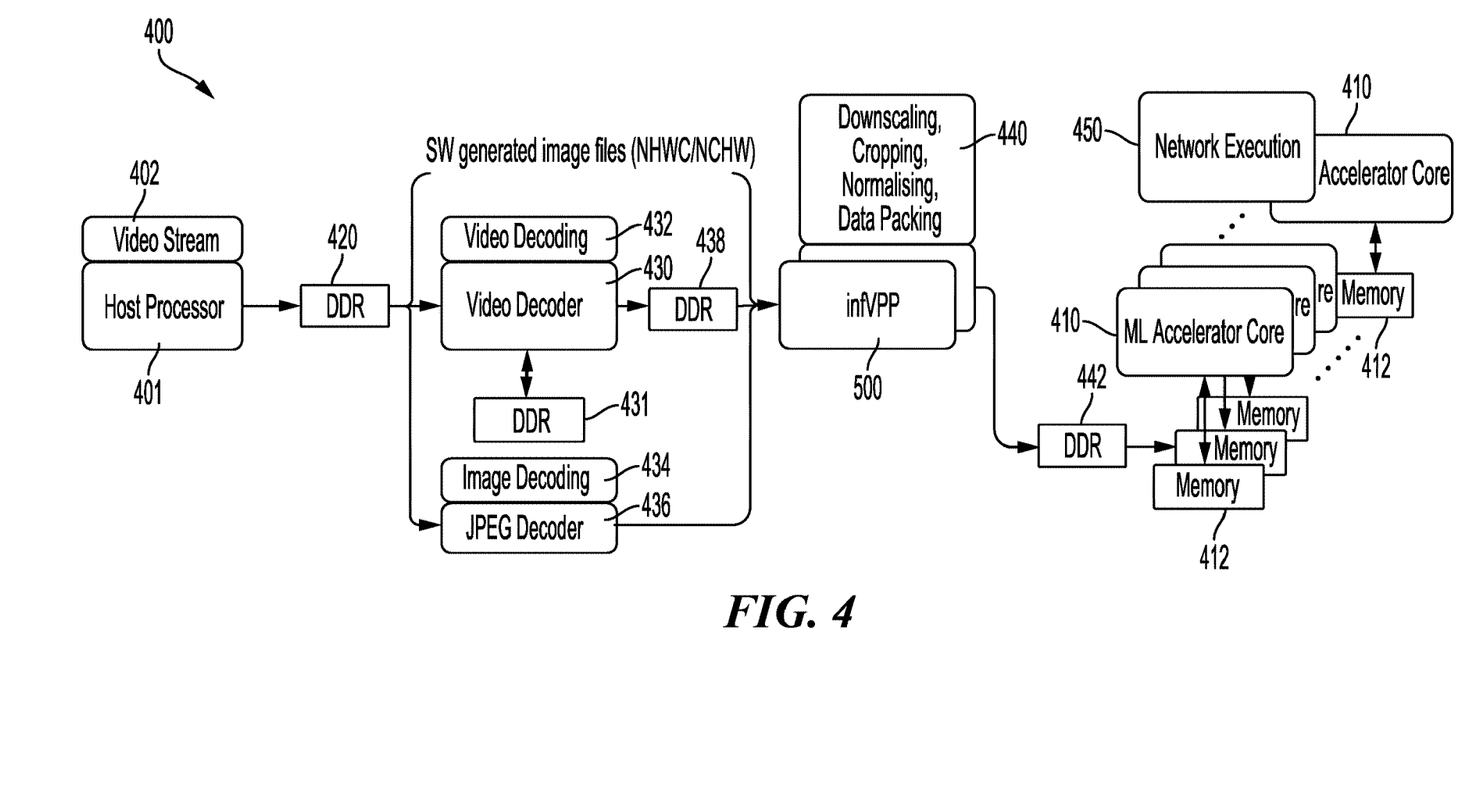
FIG. 4 is a block diagram illustrating a video inference processing flow of the ML-accelerator SoC of FIG. 3, according to various aspects of the present disclosure.

FIG. 4 is a block diagram illustrating a video inference processing flow 400 of the ML-accelerator SoC 300 of FIG. 3, according to various aspects of the present disclosure. As shown in FIG. 4, the video inference processing flow 400 begins with the generation of a video stream 402 by a host processor 401, which is stored in DDR memory 420. In this example, the host processor 401 generates images filed in a predetermined format (e.g., NHWC/NCHW format), which are subsequently stored in the DDR memory 420. Once stored, the image files are decoded by an image decoder 436 (e.g., a joint photographic experts group (JPEG) decoder) during an image decoding stage 434. Additionally, a video decoder 430 (e.g., video decoder 330 of FIG. 3) decodes images in a predetermined video format (e.g., luma (Y) blue projection (U) red projection (V) (YUV) format) during a video decoding stage 432 using DDR memory 431 for storing reference frames. The decoded video output from the video decoder 430 is stored in DDR memory 438.

In various aspects of the present disclosure, the infVPP module 500 provides an offline, memory-to-memory (e.g., DDR memory 438 (first memory) to DDR memory 442 (second memory)) processing engine controlled by a CPU, such as the CPU 360 of FIG. 3. For example, the infVPP module 500 provides downscaling. cropping, normalizing, and data packing operations on decoded video/image data stored in the DDR memory 438, with the processed data stored as activation input data in the DDR memory 442 for the ML-accelerators (e.g., neural signal processors (NSPs) executing ML network models) of a network execution stage 440.

Integrating the infVPP module 500 in the ML-accelerator SoC 300 of FIG. 3 enables operation with the video decoder 430, which may be configured to support twenty-four (24) streams of video frames in predetermined resolution (e.g., 1080p or 4K resolution). The video decoder 430 may be further configured to process image data in a predetermined (e.g., YUV) format. In various aspects of the present disclosure, output video frame data is compressed using universal bandwidth compression (UBWC) and stored in the DDR memory 438. The decoded video/image data from the video decoder 430 may be processed by the infVPP module 500 to provide image processing, image data scaling, and formatting in the packed dense depth data dump (D4) format to provide activation input data for machine learning network models executing on NSPs, such as ML-accelerator cores 410. These machine learning network models are compatible with three-channel RGB format, which is supported using data packed (organized) in D4 format by the infVPP module 500. Without integrating the infVPP module 500 in the ML-accelerator SoC 300, the video decoder 430 is forced to write the decoded frame data without the UBWC, resulting in a significant (e.g., 50%) drop in video decoding efficiency (e.g., 12×1080p 30 frames per second (FPS) or 4K ultra high definition (UHD) 30 FPS).

During the network execution stage 440, the ML-accelerator cores 410 (e.g., ML-accelerator cores 310 of FIG. 3) process the activation input data from the DDR memory 442 utilizing memory 412. In operation, ML network models executing on ML-accelerator cores 410 (e.g., NSPs) process images at lower resolution (e.g., 224×224, 512×512, 720×720), including channel separated RGB images. Additionally, received image data is scaled (e.g., normalized, standardized, and quantized) and data is packed in the D4 format by the infVPP module 500 for efficient processing by the ML-accelerator cores 410. As shown in FIG. 4, the infVPP module 500 reads the video frames generated by the video decoder 430 and prepares the data for feeding to the ML network models executing on NSPs (e.g., the ML-accelerator cores 410). For video inferencing, the infVPP module 500 can efficiently execute video or image processing functions. In particular, the infVPP module 500 significantly improves (e.g., by more than 30%) an overall performance of the ML-accelerator cores 410, in terms of inferences performed per second (inference/sec).

FIG. 5 is a block diagram further illustrating the inference video pre-processing (infVPP) module 500 of FIGS. 3 and 4, configured to output data in a machine learning (ML) storage acceleration format, in accordance with various aspects of the present disclosure. The infVPP module 500 includes a data unpacker 530 to unpack video data from a bus read block 520 in response to a command 510. The bus read block 520 may read the video data from a video subsystem (VideoSS) network-on-chip (NoC) 502. In this configuration, the video data is provided to a transformation/multi-dimensional scaling/cropping logic 540. The transformation/multi-dimensional scaling/cropping logic 540 may perform pre-processing/post-processing on a decoded image or video stream. The transformation/multi-dimensional scaling/cropping logic 540 outputs red (R) pixels 542. green (G) pixels 544, blue (B) pixels 546, and RGB channels 548.

Figure 6:
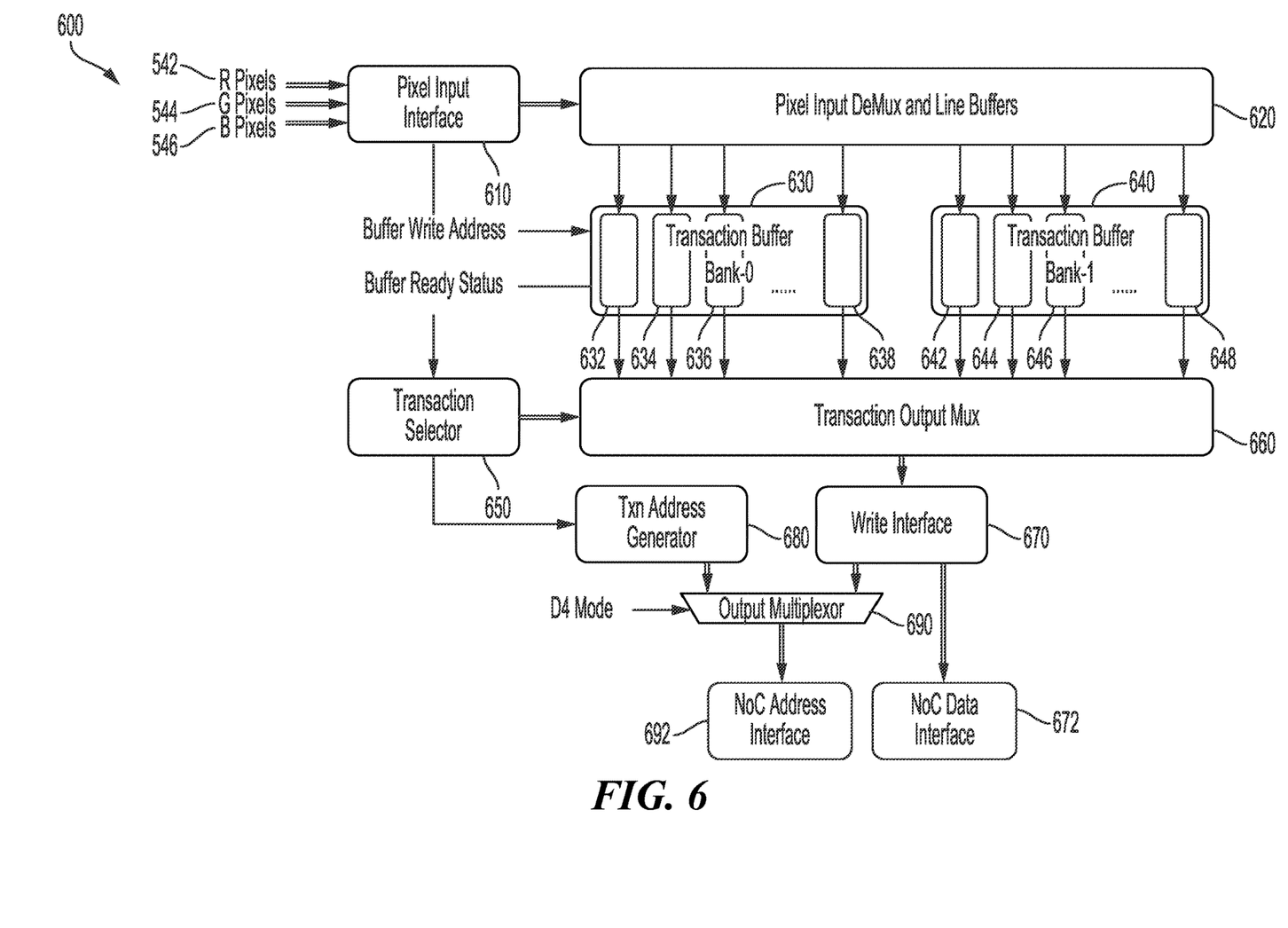
FIG. 6 is a block diagram further illustrating the machine learning (ML) storage acceleration format block of FIG. 5, in accordance with various aspects of the present disclosure.

The infVPP module 500 may process the first layer of a computer vision ML network. In practice, the first layer of many computer vision ML networks is limited to three channels (e.g., red, green, and blue (RGB)). In practice, a tensor may represent the first layer of the computer vision ML network according to a standard NCHW (e.g., batch_size (N), channel (C), height (H), weight (W)) format or an NHWC (e.g., batch_size (N), height (H), weight (W), channel (C)) format, which is fully packed and does not waste any space. By contrast, layers of a computer vision ML network beyond the first layer usually have a greater number of channels (e.g., 32 or more channels). Unfortunately, ML hardware-accelerators expect a different data format. In these aspects of the present disclosure, the R pixels 542, G pixels 544, and B pixels 546 are processed by an ML storage acceleration format block 600, which outputs the pixel data in an ML storage acceleration format to a bus write block 550 to write the formatted data to the VideoSS NoC 502.

FIG. 6 is a block diagram further illustrating the machine learning (ML) storage acceleration format block 600 of FIG. 5, in accordance with various aspects of the present disclosure. As shown in FIG. 6, the ML storage acceleration format block 600 includes a pixel input interface 610 to receive, for example, the R pixels 542, the G pixels 544, and the B pixels 546 from the transformation/multi-dimensional scaling/cropping logic 540 of FIG. 5. In operation, each RGB channel from the R pixels 542, the G pixels 544, and the B pixels 546 sends four pixels-per-clock (PPC). The ML storage acceleration format block 600 also includes pixel input de-multiplexer (DeMux) and line buffers 620 coupled to the pixel input interface 610. In this configuration, the pixel input DeMux and line buffers 620 de-multiplex two-by-two (2×2) RGB pixels, which are sorted and stored in transaction buffers 632, 634, 636, and 638 of a first transaction buffer bank 630 simultaneously. In a stride-2 mode, the first two lines are stored in the pixel input DeMux and line buffers 620. During the next two lines, the incoming pixels, and pixels from the pixel input DeMux and line buffers 620 are transferred to transaction buffers, such as transaction buffers 642, 644, 646, and 648 of a second transaction buffer bank 640.

In some aspects of the present disclosure, each of the transaction buffers (e.g., 632, 634, 636, 638, 642, 644, 646, and 648) are eight bits wide and can hold a full two hundred fifty-six (256) byte transaction. During operation, a transaction selector 650 selects a transaction for writing from the transaction buffers (e.g., 632, 634, 636, 638, 642, 644, 646, and 648). For example, the transaction selector 650 selects the transaction based on the availability of transaction data in one of the transaction buffers (e.g., buffer full), when a transaction is selected for writing. In response to the transaction selector 650, a transaction output multiplexor (Mux) 660 forwards transaction data from the selected transaction buffer (e.g., 632, 634, 636, 638, 642, 644, 646, and 648) to a write interface 670. In addition, a transaction (Txn) address generator 680 generates the address for the write transaction, which is replaced by an output multiplexor 690 at an NoC address interface 692 and an NoC data interface 672 at an output of the write interface 670.

Some aspects of the first transaction buffer bank 630 and the second transaction buffer bank 640 operate in ping-pong mode. For example, while the first transaction buffer bank 630 is filled with incoming pixels, the second transaction buffer bank 640 is drained out to the write interface 670. Similarly, while the second transaction buffer bank 640 is drained out to the write interface 670, the first transaction buffer bank 630 is filled with incoming pixels. Each of the pixel input DeMux and line buffers 620 can hold 6096 pixels (e.g., full image line width) before filling the first transaction buffer bank 630 and/or the second transaction buffer bank 640. For a stride-2 mode, two lines each for the RGB channels (e.g., total of six lines) of the R pixels 542, the G pixels 544, and the B pixels 546 are stored in the pixel input DeMux and line buffers 620.

For a spatial major stride-2 mode, the first two lines are stored in the pixel input DeMux and line buffers 620. During the next two lines, the incoming pixels (e.g., the R pixels 542, the G pixels 544, and the B pixels 546) and pixels from the pixel input DeMux and line buffers 620 are stored in the transaction buffers (e.g., 632, 634, 636, 638, 642, 644, 646, and 648). This sequence of operations is repeated after every four lines. In these aspects of the present disclosure, the ML storage acceleration format block 600 converts the first layer of neural network data to an ML storage acceleration format. In some aspects of the present disclosure, the ML storage acceleration format is compatible with cases in which an initial layer is a stride-2 convolution using a decimate-by-four approach. In addition, the ML storage acceleration format is also compatible with cases in which the initial layer is using precision of either floating point sixteen (FP16) or quantized integer eight (INT8). The ML storage acceleration format also supports both spatial and channel major formats of matrix units. Furthermore, the ML storage acceleration format may take advantage of matrix instructions that allow for sub-block (e.g., four input channel) granularity, as further described in co-pending U.S. patent application Ser. No. 17/946,753.

Figure 7A:
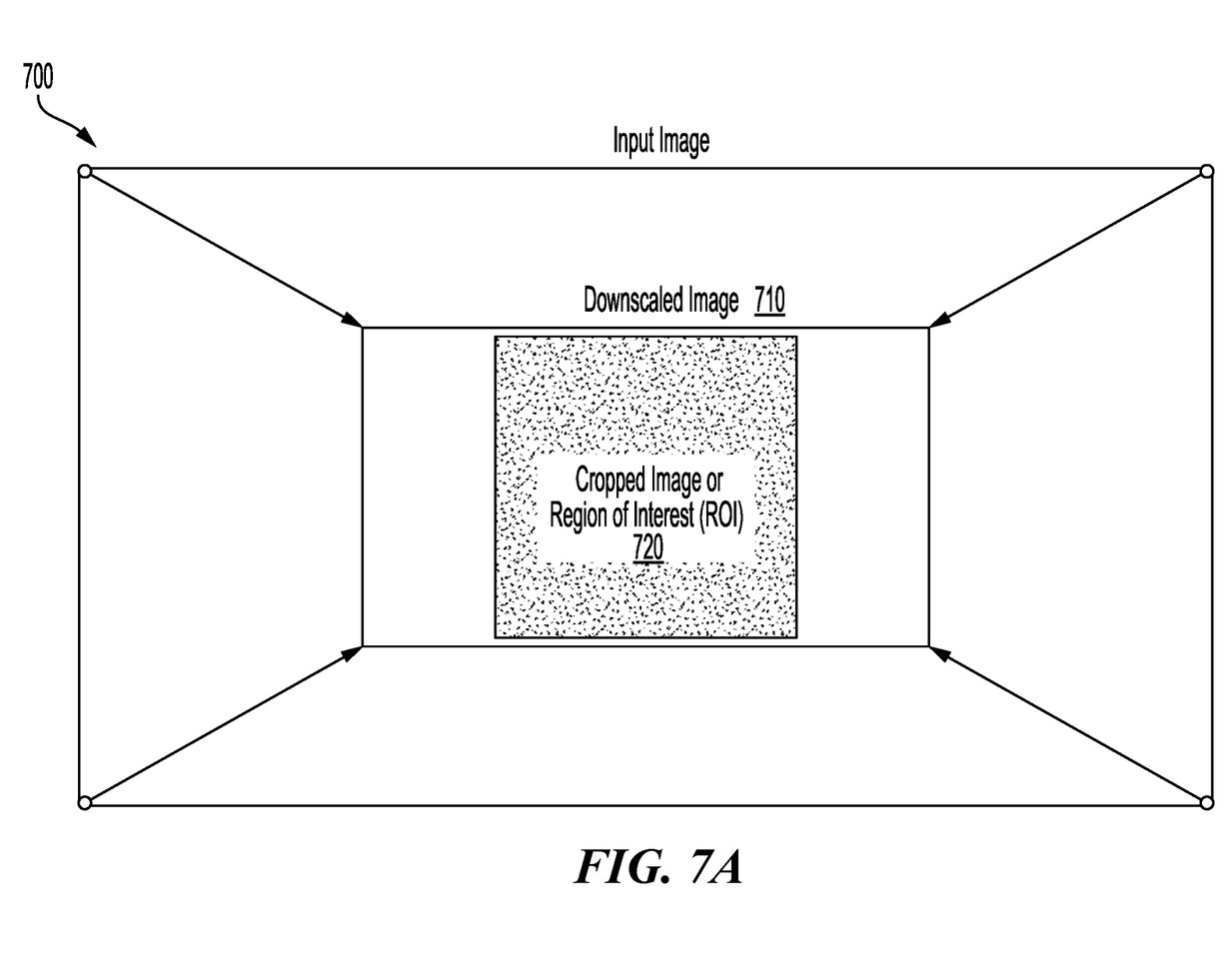
FIGS. 7A and 7B are block diagrams illustrating a flexible region of interest selection scheme, in accordance with various aspects of the present disclosure.
Figure 7B:
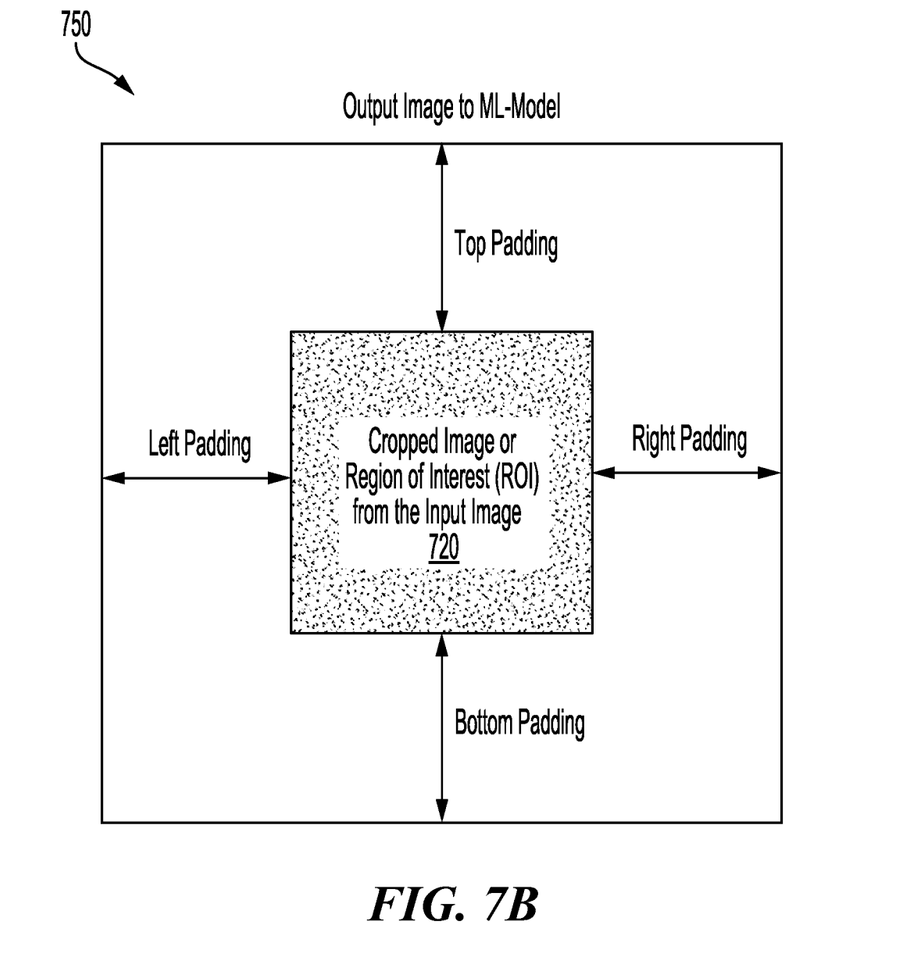

FIGS. 7A and 7B are block diagrams illustrating a flexible region of interest selection scheme, in accordance with various aspects of the present disclosure. Various aspects of the present disclosure provide an integrated hardware solution for image/video processing for on-chip ML accelerated inferencing. As shown in FIGS. 7A and 7B, this integrated hardware solution supports flexible region of interest (RoI) selection in an input image/video frame with a unique combination of down-scaling, cropping, up-scaling, and padding functions. FIG. 7A illustrates an input image 700 from which a downscaled image 710 is generated. As further illustrated in FIG. 7A, a cropped image/region of interest (RoI) 720 is selected from the downscaled image 710.

As shown in FIG. 7B, an output image to an ML-model is shown along with the RoI 720 selected from the input image 700 of FIG. 7A. The output image 750 further includes top padding, bottom padding, left padding, and right padding surrounding the RoI 720. Image data scaling (e.g., normalize, standardize, and quantize) in IEEE-FP32 precision using novel format conversion modules is supported. This enables efficient execution of pre-trained ML models in various floating- and fixed-point precisions (e.g., single-precision floating-point format (IEEE-FP32), brain floating point (Bfloat16), 16-bit floating point (FP16), and 8-bit floating point (FP8)). The disclosed inline data packing (in D4 format) enables efficient execution of the ML-accelerators. Additionally, this integrated hardware solution enables a wide range of ML use-cases. For example, these ML use-cases include advanced driver assistance systems (ADAS) that provide pedestrian and/or license plate detection and classification. A video inference processing flow is illustrated, for example, in FIG. 8.

Figure 8:
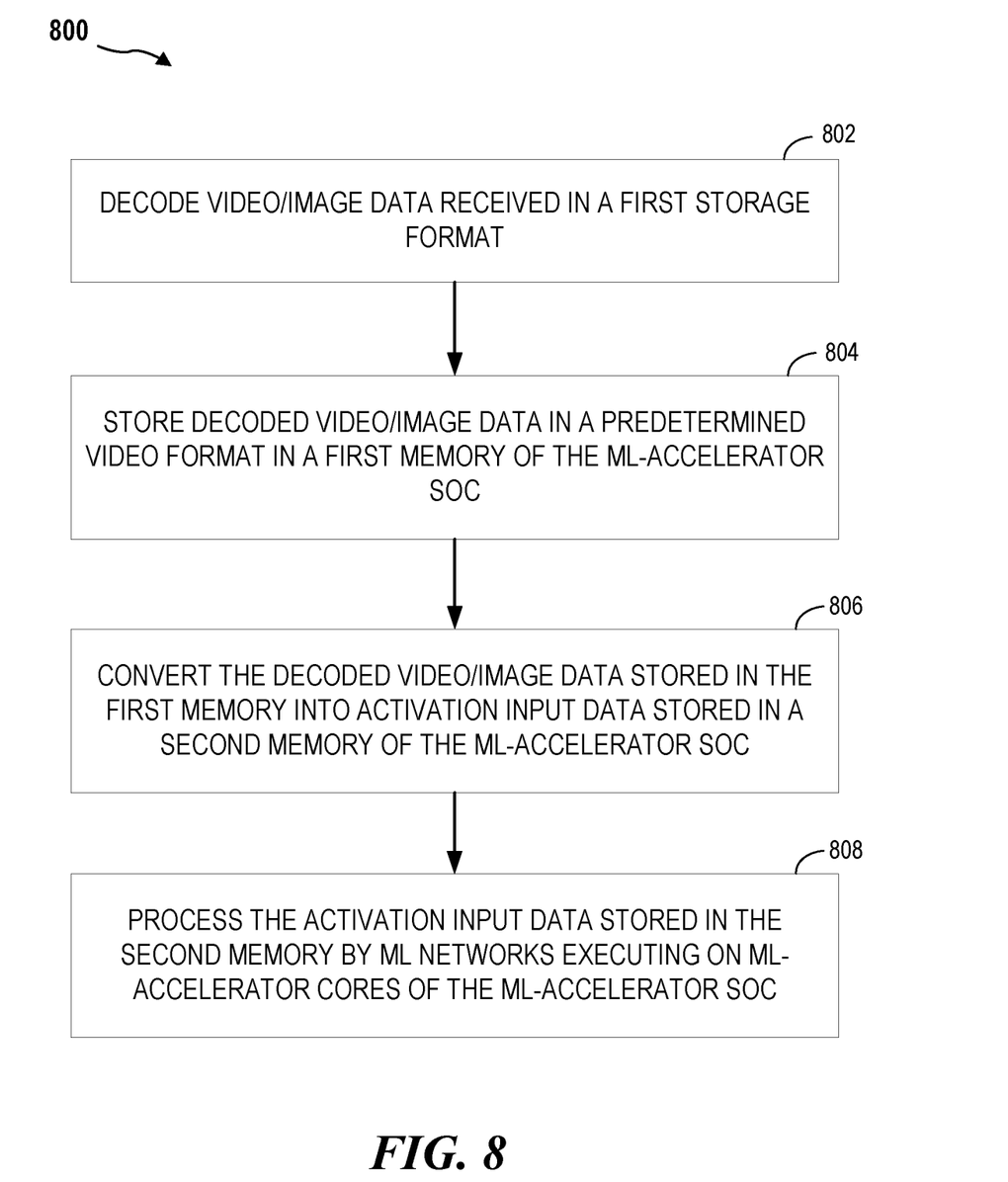
FIG. 8 is a flow diagram illustrating a method for a memory storage format to accelerate machine learning (ML) on a computing device, according to various aspects of the present disclosure.

FIG. 8 is a flow diagram illustrating a method for video inference processing on a machine learning (ML)-accelerator system-on-chip (SoC), according to aspects of the present disclosure. A method 800 begins at block 802, in which video/image data, received in a first storage format, is decoded. For example, as shown in FIG. 4, once stored, the image files are decoded by an image decoder 436 (e.g., a joint photographic experts group (JPEG) decoder) during an image decoding stage 434. At block 804, the decoded video/image data is store in a predetermined video format in a first memory of the ML-accelerator SoC. For example, as shown in FIG. 4 the video decoder 430 (e.g., video decoder 330 of FIG. 3) decodes images in a predetermined video format (e.g., luma (Y) blue projection (U) red projection (V) (YUV) format) during a video decoding stage 432 using DDR memory 431 for storing reference frames. The decoded video output from the video decoder 430 is stored in DDR memory 438.

At block 806, the decoded video/image data stored in the first memory is converted into activation input data stored in a second memory of the ML-accelerator SoC. For example, in various aspects of the present disclosure, the infVPP module 500 provides an offline, memory-to-memory (e.g., DDR memory 438 (first memory) to DDR memory 442 (second memory)) processing engine controlled by a CPU, such as the CPU 360 of FIG. 3. For example, the infVPP module 500 provides downscaling, cropping, normalizing, and data packing operations on decoded video/image data stored in the DDR memory 438, with the processed data stored as activation input data in the DDR memory 442 for the ML-accelerators (e.g., neural signal processors (NSPs) executing ML network models) of a network execution stage 440.

At block 808, the activation input data stored in the second memory is processed by ML networks executing on ML-accelerator cores of the ML-accelerator SoC. For example, as shown in FIG. 4, during the network execution stage 440, the ML-accelerator cores 410 (e.g., ML-accelerator cores 310 of FIG. 3) process the activation input data from the DDR memory 442 utilizing memory 412. In operation, ML network models executing on ML-accelerator cores 410 (e.g., NSPs) process images at lower resolution (e.g., 224×224, 512×512, 720×720), including channel separated RGB images. Additionally, received image data is scaled (e.g., normalized, standardized, and quantized) and data is packed in the D4 format by the infVPP module 500 for efficient processing by the ML-accelerator cores 410.

The method 800 includes performing image processing, image data scaling, and formatting of the decoded video/image data in a packed dense depth data dump (D4) format to provide the activation input data, for example, as shown in FIG. 6. The method 800 also includes detecting a region of interest (ROI) selection, and identifying objects in the ROI selection, for example, as shown in FIGS. 7A and 7B. The method of claim 800 further includes selecting the identified objects from an original image, and sending the identified objects to an object classification, machine learning (ML)-network. The method 800 further includes detecting a region of interest (ROI) selection in an image, and applying a combination of down-scaling, cropping, up-scaling, and/or padding to the ROI selection in the image, for example, as shown in FIGS. 7A and 7B. The method 800 further includes accelerating inference video processing of video/image data according to assigned addresses for image pixels of an image corresponding to a blocked ML storage acceleration format. The method 800 further includes assigning addresses to image pixels of each of three channels of a first layer storage format of a neural network for accessing the image pixels in a blocked ML storage acceleration format and storing the image pixels in the blocked ML storage acceleration format according to the addresses assigned to the image pixels.

In some aspects, the method 800 may be performed by the SoC 100 (FIG. 1). That is, each of the elements of method 800 may, for example, but without limitation, be performed by the SoC 100 or one or more processors (e.g., CPU 102 and/or NPU 130) and/or other components included therein.

Implementation examples are described in the following numbered clauses:

Support for multiple dependent claims will be added after approval of the initial claims*

The system for accelerating machine learning includes means for storing the image in the blocked ML storage acceleration format according to the assigned address. In one aspect, the storing means may be the storage acceleration format block 600 configured to perform the functions recited. In another configuration, the means may be any module, or any apparatus configured to perform the functions recited by the means.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Where there are operations illustrated in the figures, those operations may have corresponding counterpart means-plus-function components with similar numbering.

As used, the term "determining" encompasses a wide variety of actions. For example, "determining" may include calculating, computing, processing, deriving, investigating, looking up (e.g., looking up in a table, a database, or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read-only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed, include one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read-only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such with cache and/or general register files. Although the various components discussed may be described as having a specific location, such as a local component, they may also be configured in several ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the application and the overall design constraints imposed on the overall system.

The machine-readable media may comprise several software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage, or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc, where disks usually reproduce data magnetically, while discs reproduce data optically with lasers. Thus, in some aspects, computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein, may be downloaded and/or otherwise obtained by a user terminal and/or base station as applicable. For example, such a device can be coupled to a server to facilitate the transfer of means for performing the methods described herein. Alternatively, various methods described herein, may be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A machine learning (ML)-accelerator system-on-chip (SoC), comprising:
    a plurality of ML-accelerator cores;
    a network-on-chip (NoC) coupled to the plurality of ML-accelerator cores;
    an inference video post processing (infVPP) module coupled to the NoC; and
    an on-chip video decoder coupled to the NoC to enable single chip video or imaging ML applications,
    wherein the video decoder is operable to decode video/image data received in a first storage format and to store decoded video/image data in a predetermined video format in a first memory of the ML-accelerator SoC,
    wherein the infVPP module is operable to convert the decoded video/image data stored in the first memory into activation input data stored in a second memory of the ML-accelerator SoC,
    wherein the infVPP module is further operable to provide image processing, image data scaling, cropping, normalizing, data packing, and formatting of the decoded video/image data in a packed dense depth data dump (D4) format to provide the activation input data, and wherein the infVPP module improves decoding processing efficiency and overall performance of the ML-accelerator cores in terms of inference per second (inference/sec).

2. The ML-accelerator SoC of claim 1, in which the plurality of ML-accelerator cores comprises neural signal processors (NSPs) executing ML network models.

3. The ML-accelerator SoC of claim 1, further comprising an SoC power management block operable to control power between the ML-accelerator cores, the video decoder, and the infVPP module.

4. The ML-accelerator SoC of claim 1, in which the infVPP module is operatable to accelerate inference video processing of video/image data according to assigned addresses for image pixels of an image corresponding to a blocked ML storage acceleration format.

5. The ML-accelerator SoC of claim 1, in which the infVPP module is operable to assign addresses to image pixels of each of three channels of a first layer storage format of a neural network for accessing the image pixels in a blocked ML storage acceleration format, and to store the image pixels in the blocked ML storage acceleration format according to the addresses assigned to the image pixels.

6. The ML-accelerator SoC of claim 1, in which the plurality of ML-accelerator cores are operable to process activation input data stored in a second memory by ML networks executing on the plurality of ML-accelerator cores.

7. The ML-accelerator SoC of claim 1, in which the plurality of ML-accelerator cores comprise neural signal processors (NSPs).

8. A processor-implemented method for video inference processing on a machine learning (ML)-accelerator system on chip (SoC), the method comprising:
on-chip decoding video/image data received in a first storage format;
storing decoded video/image data in a predetermined video format in a first memory of the ML-accelerator SoC;
converting the decoded video/image data stored in the first memory into activation input data stored in a second memory of the ML-accelerator SoC; and
processing the activation input data stored in the second memory by ML networks executing on ML-accelerator cores of the ML-accelerator SoC,
wherein the converting further comprises performing image processing, image data scaling, cropping, normalizing, data packing, and formatting of the decoded video/image data in a packed dense depth data dump (D4) format to provide the activation input data, and
wherein the converting improves decoding processing efficiency and overall performance of the ML-accelerator cores in terms of inference per second (inference/sec).

9. The method of claim 8, in which the first storage format comprises a first layer storage format of the ML networks.

10. The method of claim 8, in which converting further comprises normalizing, scaling, and/or quantizing the decoded video/image data.

11. The method of claim 8, further comprising:
detecting a region of interest (ROI) selection; and
identifying objects in the ROI selection.

12. The method of claim 11, further comprising:
selecting identified objects from an original image; and
sending the identified objects to an object classification, machine learning (ML)-network.

13. The method of claim 8, further comprising:
detecting a region of interest (ROI) selection in an image; and
applying a combination of down-scaling, cropping, up-scaling, and/or padding to the ROI selection in the image.

14. The method of claim 8, further comprising accelerating inference video processing of video/image data according to assigned addresses for image pixels of an image corresponding to a blocked ML storage acceleration format.

15. The method of claim 8, further comprising:
assigning addresses to image pixels of each of three channels of a first layer storage format of a neural network for accessing the image pixels in a blocked ML storage acceleration format; and
storing the image pixels in the blocked ML storage acceleration format according to the addresses assigned to the image pixels.

16. The method of claim 8, in which the plurality of ML-accelerator cores comprise neural signal processors (NSPs).

* * * * *